(12) United States Patent
Boling (10) Patent No.: US 6,289,632 B1
(45) Date of Patent: *Sep. 18, 2001

(54) PLANT DRAINAGE SYSTEM

(76) Inventor: John C. Boling, 231 Waller St., San Francisco, CA (US) 94102

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/683,734

(22) Filed: Jul. 18, 1996

(51) Int. Cl.[7] ................................................. A01G 25/00
(52) U.S. Cl. ................................................................ 47/79
(58) Field of Search ............................ 47/65.6, 71, 62 E (56) References Cited

U.S. PATENT DOCUMENTS

| | | | |
|---|---|---|---|
| 3,362,105 | * 1/1968 | Steiger | 47/65.6 |
| 4,232,482 | 11/1980 | Watt et al. | 47/71 |
| 4,276,720 | 7/1981 | Lyon | 47/39 |
| 4,287,682 | 9/1981 | Browne | 47/81 |
| 4,603,506 | * 8/1986 | Powell, Jr. | 47/62 E |
| 4,986,699 | 1/1991 | Bohnhoff | 405/50 |
| 5,062,239 | * 11/1991 | Helton | 47/67 |
| 5,190,404 | 3/1993 | Kiyokawa et al. | 405/45 |
| 5,448,854 | * 9/1995 | Hirsch et al. | 47/65.6 |

FOREIGN PATENT DOCUMENTS

| | | | |
|---|---|---|---|
| 1003488 | * 2/1957 | (DE) | 47/65.6 |
| 815709 | * 7/1937 | (FR) | 47/65.6 |
| 2384445 | * 11/1978 | (FR) | 47/65.6 |
| 17945 | * of 1910 | (GB) | 47/65.6 |

* cited by examiner

*Primary Examiner*—Charles T. Jordan
*Assistant Examiner*—Francis T. Palo

(57) ABSTRACT

Drainage apparatus allows a vessel such as a plant pot to be advantageously drained of a fluid such as water. The inventive drainage apparatus includes a drainage member having a base member and a channel member. The base member is affixed to a portal of the pot so as to allow fluid drainage when the pot is filled with soil containing a fluid, such as water. Water gravitationally drains out of the portal and into the channel member of the drainage member, so as to dispose of the water at a selected distance away from the portal. Hence standing water below the pot, a common problem with potted plants, is avoided. The water can be further channeled away from the pot by engaging a hose member to the channel member.

The drainage member can be affixed to the pot by a laminated adhesive layer or alternatively by caulking. The laminated adhesive layer can be affixed to the pot using a primer, if desired.

In another embodiment, the base member is configured to present two wings which are deformably inserted up through the portal so that the wings then resume substantially their initial position. This is a method which can be used even when the pot is already filled with soil. After the wings of the base member have assumed their original position on the interior of the pot, the base member is adjusted so that the wings rest against the bottom of the pot. The drainage apparatus can then further be sealed by using a ring on the outside of the pot. The drainage apparatus can be additionally sealed by a second ring which is affixed to the first ring by a caulk, adhesive glue or the like. The adhesive is also used to seal the second ring to the channel member so that fluid leakage is avoided at the portal.

3 Claims, 6 Drawing Sheets

PLANT DRAINAGE SYSTEM

BACKGROUND OF THE INVENTION

1. Field of the Invention

This invention relates to a plant drainage system, especially the drainage of fluid from the bottom of a plant-containing vessel. More particularly it is concerned with drainage apparatus mounted on a pot so as to provide advantageous drainage of water away from a floor or deck where the pot is standing.

2. Description of the Prior Art

Plant pots come in a variety of sizes and shapes but typically have a hole or drainage portal in the bottom to allow for gravitational drainage of water, which may contain fertilizer, plant food or the like. While the drainage hole is designed to allow fluid to escape the pot, such a passive system creates several problems. Often the pot is standing on a saucer-like plate having an upstanding rim to catch and contain the water. The problem is that the drainage water stands in the plate until it evaporates, is pulled back in by capillary action, is manually removed or recycled into the topsoil of the plant.

Manual removal of the water sometimes does not occur as often as is desirable for any number of reasons, e.g. the plant owner may be absent for an extended period, may simply forget or the pot may be heavy or difficult to lift. The drainage water may therefore be left standing for a long period of time, which causes root rot, and is hygenically and esthetically undesirable. It will also be appreciated that standing water is generally detrimental for the floor, deck or other supporting surface.

Manual removal itself creates problems, since spillage sometimes occurs. Also the standing water can overfow the saucer if not removed for an extended period.

Further, it is evident that a system which eliminates the necessity for manual removal of water would be inherently desirable by reducing plant maintenance. What is needed is a plant drainage system which allows for drainage of water from the bottom of the plant so as to eliminate the water without the necessity of manual removal and to prevent the build up of standing water in undesirable areas.

One attempt to deal with the problem of standing water is a system where a reservoir of water is held below the pot with sufficient spatial communication between the pot and the reservoir. Water is drawn drawn back up into the plant soil by the capillary action of the root system. The problem with this alternative is that it is a passive system which doesn't adequately regulate the amount of moisture in the reservoir. In other words, if the system becomes saturated with water, the system will not effectively get rid of the excess water.

Another attempt is the use of a pump along with a moisture sensor in the soil, so that when the soil is sufficently dry, the pump is activated by the sensor, resulting in water being pumped back into the pot. The problem with this alternative is that it is an active system, requiring electronic and mechanical apparatus, additional expense, energy, maintenance, etc.

SUMMARY OF THE INVENTION

The problems outlined above are solved by the system and apparatus provided in accordance with the present invention. That is to say, the drainage apparatus hereof serves to channel fluid gravitationally out the bottom of a pot to a preferred area away from the pot, and further provides for ease of installation, even for a pot already filled with soil or the like. The drainage apparatus in accordance with the present invention broadly includes a drainage member having a base member, a channel member and an adhesive layer. The base member has a first side and a second side, including portions defining a hole disposed between the first and second sides. The channel member is sealingly affixed to the base member, and has a first open end and a second open end disposed to define a channel, such that the first open end is in spatial communication with the hole of the base member. The adhesive layer is disposed adjacent the first side of the base member, and is suitable for adhesion to the exterior of the wall of the pot. When the hole of the base member is aligned with the portal of the vessel and the adhesive layer is attached to the wall of the vessel, the drainage member serves to provide directed fluid communication between the interior of the vessel and the second end of the channel member, so that fluid is directed from the interior of the pot to an area other than the area directly below the pot.

In preferred embodiments, the drainage apparatus is a drainage assembly which includes a hose member for further channeling the fluid away from the area directly below the pot. The drainage assembly can be mounted exteriorly of the pot, or can be mounted so the base member resides on the interior of the pot.

An adhesive layer may be omitted, and in certain embodiments its adhesive function is replaced by caulk or the like. In other embodiments, the drainage member may be mounted on the interior of the pot, without adhesive action (e.g. by utilizing a grab ring exterior to the pot) or with either an adhesive tape or caulk utilized on the interior.

BRIEF DESCRIPTION OF THE DRAWINGS

FIG. 8 is an exploded, partial, perspective view of another drainage assembly;

DESCRIPTION OF THE PREFERRED EMBODIMENT

Figure 1:
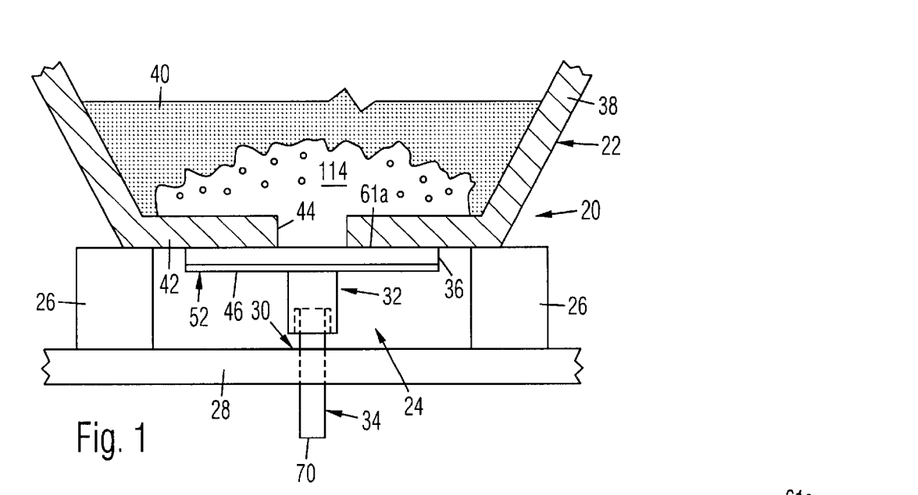
FIG. 1 is a partially sectional, side elevational view of a drainage system mounted on blocks resting on a floor in accordance with the present invention.

Referring now to the drawings in general and FIG. 1 in particular, a drainage system 20 broadly includes a vessel or pot 22 and drainage assembly 24, elevated by blocks 26 above a floor 28, which could also be a deck or other suitable surface. Drainage assembly 24 in accordance with the invention advantageously channels fluid such as water (not shown) away from an area 30 where standing fluid would be undesirable. FIG. 1 is a partial depiction for ease of illustration.

Drainage assembly 24 includes drainage member or flange 32 and hose member 34. Drainage member 32 optionally includes an adhesive tape 36 (see FIGS. 2A and 2B for exploded views). Drainage assembly 24 is mounted on pot 22 as discussed below. Drainage member 32 is suitable for draining fluid from pot 22, especially from area 30. Pot 22 has a wall 38 which defines an interior 40 of vessel 22. Wall 38 also has a base 42 which includes portions defining a portal 44 through wall 38, through which fluid can pass.

Figure 2A:
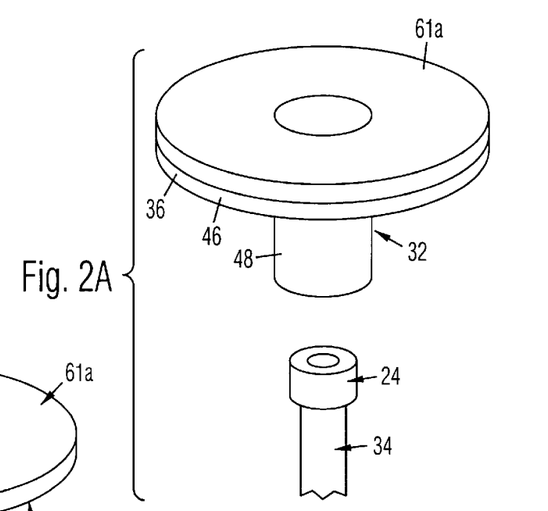
FIG. 2A is an exploded, partial, perspective view of a drainage assembly.

Referring to FIG. 2A, drainage member 32 has a base member 46 and a channel member 48 as well as the previously mentioned adhesive layer 36.

Figure 2B:
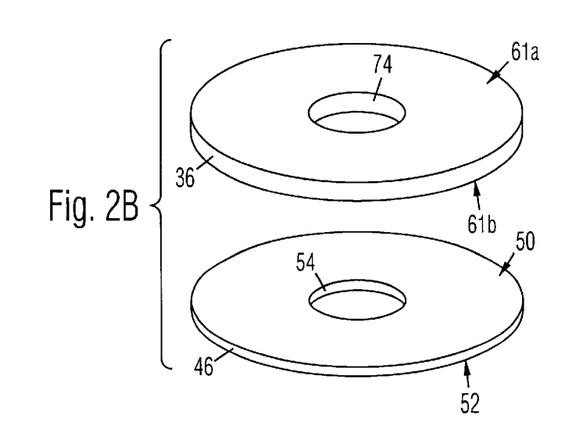
FIG. 2B is an exploded, perspective view of a laminar tape and base member.

Referring to FIG. 2B, base member 46 has a first side 50, a second opposite side 52 and portions of base member 46 defining a hole 54.

Figures 2C, 3A:
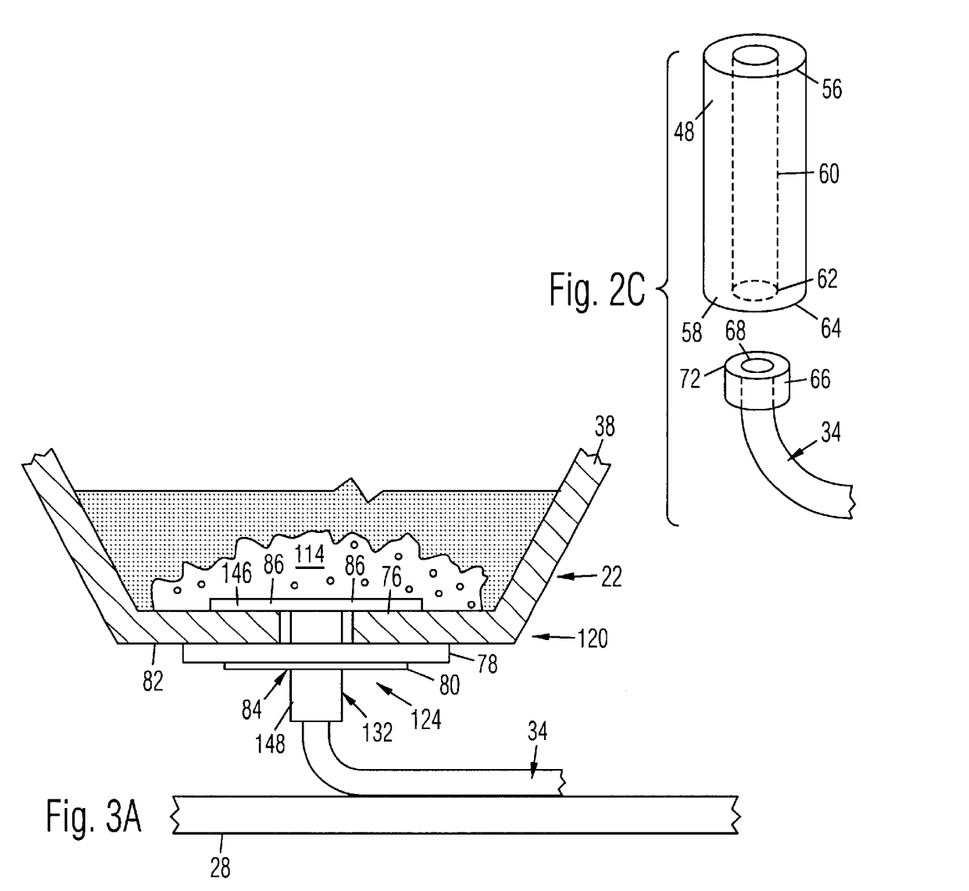
FIG. 2C is an exploded, partial, perspective view of a channel member and hose member.
FIG. 3A is a partially sectional, side elevational view of another drainage system above a floor.

Referring to FIG. 2C, channel member 48 is shown in exploded view with hose member 34. Channel member 48 is sealingly affixed to base member 46 (although shown in isolation in FIG. 2C for clarity of illustration) and includes a first open end 56 and a second open end 58. Channel member 48 is disposed to define a channel 60 which places first open end 56 in spacial communication with second open end 58.

Referring again to FIG. 2B, adhesive member 36 is adhesive on a first side 61a and a second opposite side 61b thereof, and at second side 61b, adhesive member 36 adheres to first side 50 of base member 46. Base member 46 is preferably made of a synthetic resin material and is relatively rigid in the preferred embodiment. In particularly preferred embodiments base member 46 is a clear, rigid vinyl circular piece cut to either a 2. or 3. diameter, with centered hole 54 (⅜. and ½. diameter respectively). Base member 46 and other rigid circular objects described herein are obtained in 22. by 52. clear, polished vinyl sheets, 30 mils thick. The sheets can be purchased from Cadillac Plastics of Hayward, Calif.

Referring again to FIG. 2C, channel member 48 is constructed of sufficiently flexible material to resiliently deform when disposed so as to be between a heavy object, such as pot 20, and a hard surface, such as floor 28. Channel member 48 is a clear-vinyl, cylindrically-shaped tube having a ⅜. inner diameter and ½. outer diameter or a ½. inner diameter and ⅝. outer diameter for 2. and 3. base members 46, respectively. For externally mounted embodiments, the preferred length of channel member 48 is ¾. and base member 46 has an outer diameter of 3. This type of tube can be obtained from Harrington Plastics in San Carlos, Calif. For internally mounted embodiments utilizing caulk, the preferred channel member length is 4. For internally mounted embodiments utilizing tape 36, the preferred length of channel member 48 is 1½. Although in the embodiment shown in FIG. 1 channel member 48 is off the floor 28, in other embodiments channel member 48 can be positioned directly on floor 28 with the weight of pot 22 bearing directly thereon.

Still referring to FIG. 2C, second open end 58 of channel member 48 presents an inner diameter 62 and an outer diameter 64. Hose member 34 includes a hose adapter 66 which is fitted to a first open end 68 of hose member 34. Hose member 34 also has a second open end 70 (see FIG. 1). Hose adapter 66 presents an outer diameter 72. The inner diameter 62 of channel member 48 and the outer diameter 72 of hose adapter 66 are substantially similar so that hose member 34 is sealingly, removably engaged with channel member 48 by virtue of the snug fitting of hose adapter 66 in second open end 58 of channel member 48.

Referring again to FIG. 2B, laminated tape member 36 includes a hole 74 aligned with hole 54 of base member 46 so that fluid can pass through both holes 74 and 54.

Figures 4A, 4B, 4C:
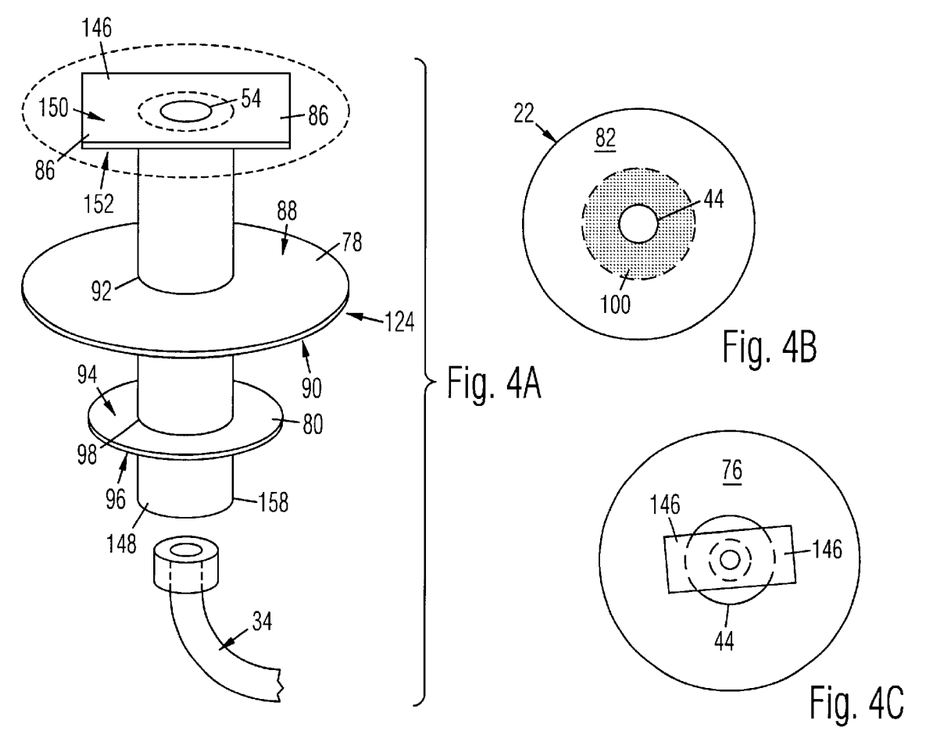
FIG. 4A is an exploded, partial, perspective view of the drainage assembly of FIG. 3A.
FIG. 4B is a bottom view of the pot of FIG. 3A.
FIG. 4C is a plan view of the bottom interior of the pot and the top of the base member of FIG. 3A.

FIG. 3A illustrates another embodiment of the present invention, where base member 146 is modified by reduction of material (see FIGS. 4A and 4C). No means of support for system 120 is shown for ease of illustration, but it will be readily understood that blocks, mounted hook or ceiling rope, etc. could be used. In the illustrated embodiment, material has been removed (the dotted lines indicating the original shape, as at FIG. 2B, before reduction of material) so as to shape base member 146 to be less circular and preferably to have a smaller outer diameter than base member 46 (compare FIGS. 2B and 4A). The reduced, less circular shape is advantageous for installation reasons to be discussed below. Base member 146 need not be adhesively fixed to an interior bottom 76 of pot 22. In addition, two synthetic resin rings are preferably employed, a first ring 78 and a second ring 80. Rings 78, 80 are made of the same synthetic resin material as 146. Ring 78 may be of greater diameter than ring 80, as shown. Ring 78 is adhesively affixed to an exterior bottom 82 of pot 22 preferably by caulk, glue or the like, in a water-tight fashion. Second ring 80 is adhesively fixed to first ring 78, also preferably by caulk. Second ring 80 is also sealingly engaged to channel member 48, preferably by adhesive as indicated at sealing point 84.

The caulk preferably adheres to both dry and moist surfaces. This allows application of base member 46 or 146 to dry pots (often new) and pre-planted pots. Brand Silkaflex-241 is preferred but the Silkaflex SEA-L caulk is used in consumer installation kits be cause it is available in a smaller tube. Both are one-component polyurethane that remain permanently elastic and non-corrosive. Either can be used above or below the water line. These products are commonly available in hardware stores.

Referring to FIG. 4A, drainage assembly 124 of FIG. 3 is shown in a somewhat exploded view to illustrate detail. Base member 146 includes two wing members 86 as well as hole 54 substantially exactly the same as hole 54 of base member 46. Wing members 86 are deformably resilient for reasons to be discussed below. Base member 146 has a first side 150 and a second side 152 analagous to first side 50 and second side 52 of base member 46 (see FIG. 2B). Second side 152 of base member 146 may be adhesively affixed to interior bottom 76 of pot 22 proximate to portal 44 (see FIG. 3A), with caulk or the like, but in practice, no adhesive is used for that purpose.

Still referring to FIG. 4A, first ring member 78 includes a first side 88 and an opposite second side 90. First ring member 78 includes portions defining a hole 92, disposed between first side 88 and second side 90 of first ring member 78. First side 88 of first ring member 78 is adhesively affixed to exterior bottom 82 of pot 22 (see FIG. 3A) and hole 92 of first ring member 78 receives channel member 48 as shown. Second ring member 80 has a first side 94 and an opposite second side 96 and portions defining a hole 98 disposed between first side 94 and second side 96. First side 94 of second ring member 80 is adhesively fixed to second side 90 of first ring member 78 (see FIG. 3A) and hole 98 of second ring member 80 sealingly receives channel member 48 as shown in FIGS. 3A and 4A. Preferably, Silkaflex caulk is used as the adhesive.

FIG. 4B is a reduced bottom view of exterior bottom 82 of pot 22 and shows a shaded portion 100 where caulk or other suitable adhesive can be attached for the purpose of affixing first ring 78 to exterior bottom 82 of pot 22.

Figure 5:
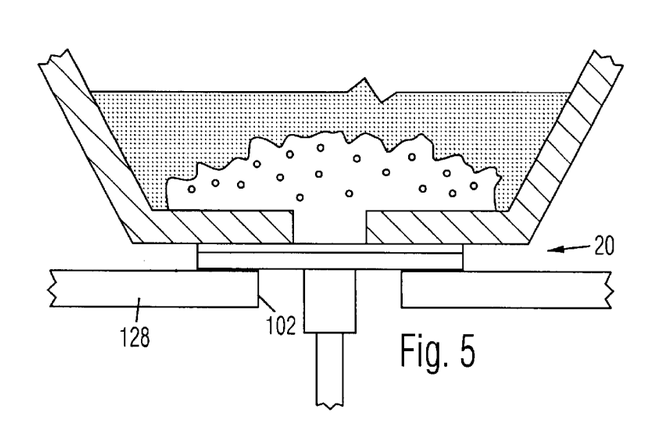
FIG. 5 is a partially sectional, side elevational view of a drainage system mounted on a floor.

Referring to FIG. 5, use of drainage system 20 is illustrated in a slightly different configuration, wherein blocks 26 are not used, so that pot 22 rests directly on floor 128. Floor 128 is shown with a hole or slat 102 through which channel member 48 protrudes.

Figure 6:
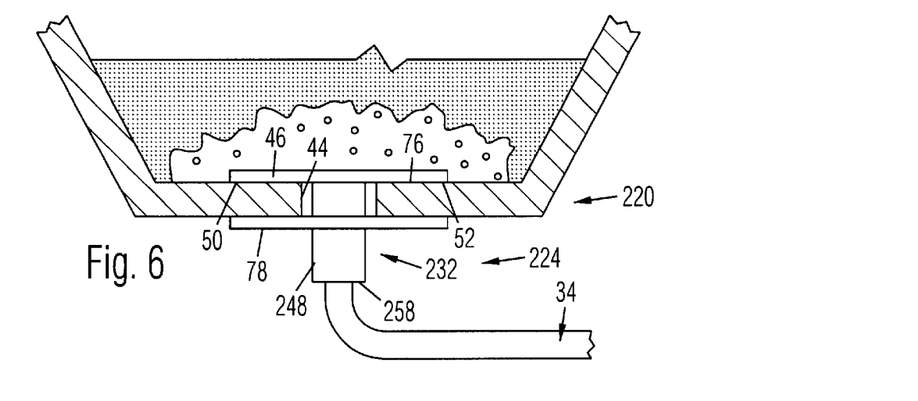
FIG. 6 is a partially sectional, side elevational view of a drainage system utilizing an interior-mounted drainage assembly including a grab ring.

Referring to FIG. 6, another embodiment of the invention is shown. A drainage assembly 224 is shown similar to that of drainage assembly 24 in FIGS. 1 and 5, except drainage assembly 224 is contacted to the interior bottom 76 of pot 22 by caulk or the like, disposed between interior bottom 76 of pot 22 and side 50 of base member 46. Essentially, the difference between drainage assembly 224 and drainage assembly 24 is that in drainage assembly 224 there is no laminar tape 36 as shown at FIG. 2B and that in drainage assembly 224, first ring member 78 is also employed as a grab ring, as discussed below.

Figure 7:
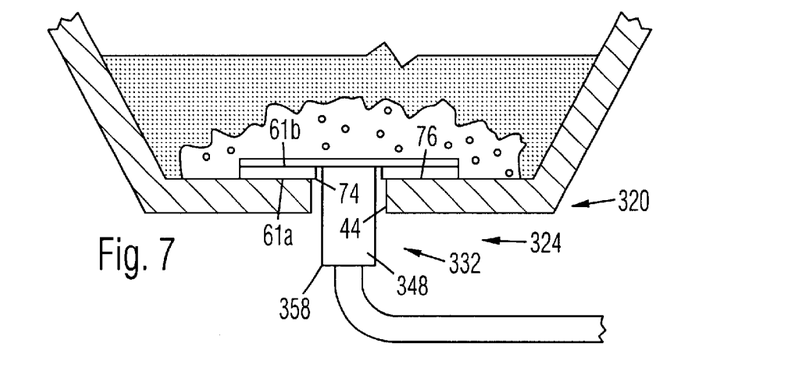
FIG. 7 is a partially sectional, side elevational view of a drainage system utilizing an interior-mounted drainage assembly.

Referring to FIG. 7, yet another embodiment of the invention is shown. A drainage assembly 324 is shown interiorly mounted and similar to that of drainage assembly 124 in FIG. 3, except drainage assembly 324 utilizes laminar tape 36, which is adhesively fixed to the bottom 76 of pot 22, and utlizes no rings 78, 80 as with drainage assembly 124. The center of tape 36 is recessed in order to illustrate hole 74.

FIG. 8 shows another embodiment, drainage assembly 424, including an additional hose 104 connected to hose 34 by a connector 106. Alternatively, hose 104 could be selected in outer diameter so as to matingly received within second open end 70 of hose member 34 without benefit of a connector.

Figure 9:
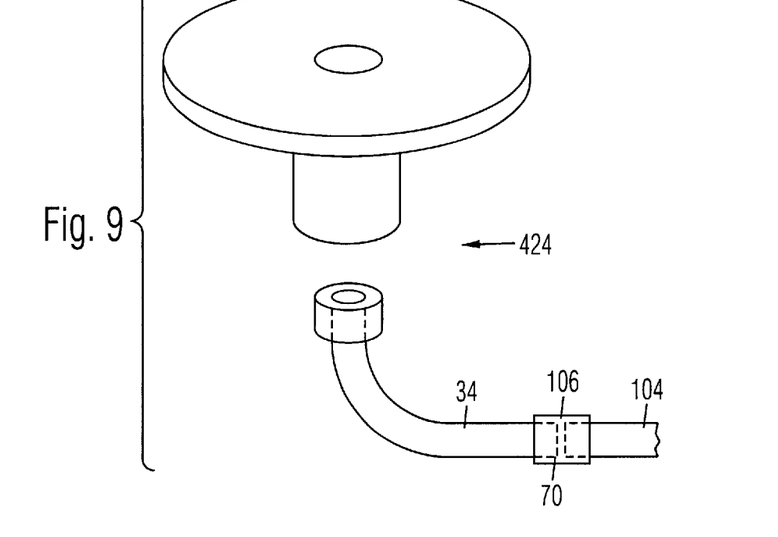
FIG. 9 is a partial, plan view of a rack used for construction of a drainage member.

The method of making drainage assemblies 24, 124, 224, 324, 424 shall now be discussed. FIG. 9 shows a plan view of rack 108 having tabs 110 with rivets 112 protruding therefrom.

Figure 10:
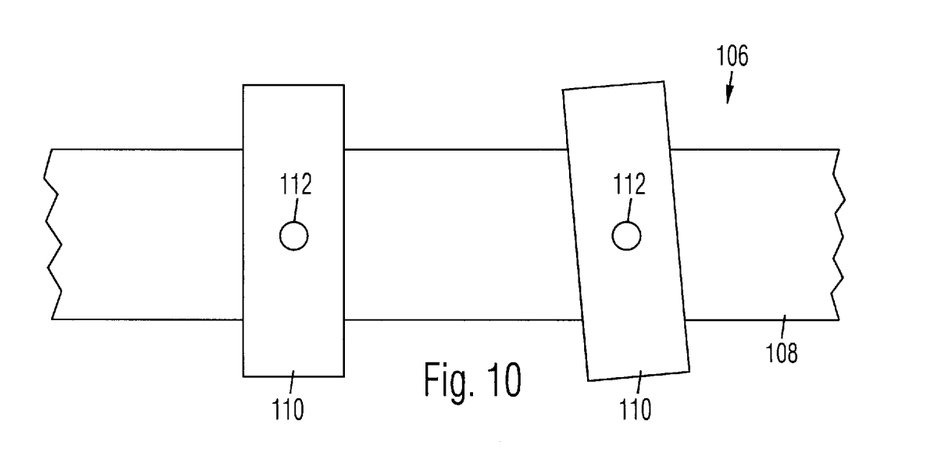
FIG. 10 is a partial, side elevational view of the rack of FIG. 9 with two drainage members being assembled thereon.

FIG. 10 shows two drainage members 32 and 132 in the course of construction from a side elevational view. One difference between drainage member 32 and drainage member 132 is the difference in length between channel members 48 and 148, the reasons for which are discussed below.

The method of assembling drainage member 32 (as in FIG. 2A) will now be described. a roll of tape, adhesive on both sides and lined on one side, such as Avery Dennison's commonly available Fasmount 2316 tape, is applied to adhere to a vinyl sheet. The specialty tape division of Avery Dennison is located in Painesville, Ohio. The Fasmount 2316 tape exhibits a 1.78 millimeters thickness. Die cutting is then performed to yield a base member 46 with attached laminar tape 36 as shown in FIG. 2A (but without channel member 48 having yet been attached). It should also be noted that the liner (not shown) of the tape, is still attached to first side 61a of laminar tape 36.

It will also be appreciated that a die could be used without a hole-punching portion in the middle, so that holes 54, 74 (see FIG. 2B) would not be produced. In this fashion a patch could be produced, either with the tape and vinyl, or the tape alone. Such a patch could be used to plug excess holes in the bottom of a pot.

Referring again to FIG. 10, base member 46 is then placed upside down and holes 54, 74 indexed with rivet 112 so that the liner (still on laminar tape 36) comes in contact with tab 110. Side 61a is indicated in FIG. 10, but it should be appreciated that at this stage of the process, side 61a is not yet exposed, due to the liner. Channel member 48 is then affixed to base member 46 as shown in FIG. 10. This is accomplished by dipping first end 56 of channel member 48 in the previously mentioned IPS Weld-On 795 cement and then abutting to second side 52 of base member 46, indexing first end 56 to rivet 112. The preferred cement, IPS WELD-ON 795, is a clear, medium-bodied, fast-set, high strength cement, avalable from IPS Corporation, of Gardena, Calif. Note that channel member 48 is sealingly affixed to base member 46 such that the first open end 56 of channel member 48 is in spacial communication with hole 54 of base member 46. Those skilled in the art will readily appreciate that injection molding could be utilized for cheaper mass production of base member 46 units. The cement preferably cures for about three minutes, or until channel member 48 is securely affixed base member 46. The resultant completed drainage member 32 may then be removed from rivet 112 and tab 110.

The method of assembling drainage member 132 (as in FIG. 3A) will now be described. A vinyl sheet is layed out. die cutting is then performed to yield a base member 46 as shown in FIG. 2B (but without channel member 48 having yet been attached).

Figure 11:
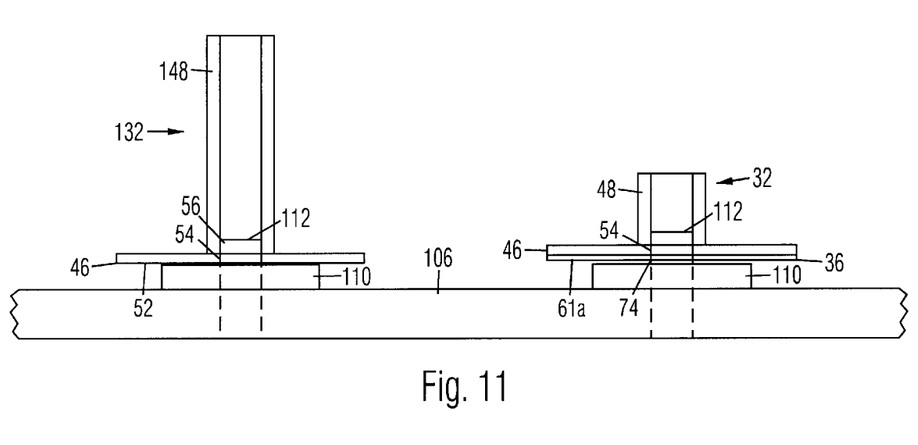
FIG. 11 is a sectional view of two drainage members being assembled.

Referring to FIGS. 10 and 11, base member 46 is placed upside down and hole 54 indexed with rivet 112 so that first side 50 comes in contact with tab 110. Channel member 148 is then affixed to base member 46 as shown in FIG. 10 with reference to drainage member 132. This is accomplished by dipping first end 156 of channel member 148 in IPS Weld-On 795 cement, indexing first end 56 to rivet 112, and then abutting to second side 52 of base member 46. The cement preferably cures for about three minutes. The resultant completed drainage member 132 may then be removed from rivet 112 and tab 110.

Instead of removing drainage member 132 from rivet 112 and tab 110 as immediately described above, it will be readily appreciated that drainage member 324 can be made by the additional attachment of laminar tape 36 to second side 52 of base member 46. This is accomplished as described immediately below.

A roll of tape, preferably the Fasmount 2316 tape described above is placed on a transfer liner, with the uncovered adhesive side of the tape adhering to the transfer liner. The tape and transfer liner are then die cut to achieve a laminar layer 36 (as shown in FIG. 2B but with a transfer liner attached to second side 61b side of laminar layer 36). Preferably, the transfer liner is then removed, hole 74 (see FIG. 7) is indexed with bottom of channel member 348 (the preferred length of channel member 348 is 1½., as opposed to channel member 148, whch has a preferred length of 4.). Then the uncovered adhesive side of tape 36 is laminated to second side 52 of base member 46 after which drainage member 324 is removed from rivet 112 for installation as shown in FIG. 7, to be discussed below.

The installation of the drainage assemblies 24, 124, 224, 324, 424 respectively to pot 22 will now be sequentially discussed.

An adhesive layer such as laminar tape 36 is disposed adjacent first side 50 of base member 46 (as discussed above with reference to drainage member 32 shown in FIG. 10), the adhesive layer being suitable to affix to wall 38 of pot 22. It will be readily understood that in place of laminar tape 36 a caulk, glue or other adhesive could be applied directly to pot 22 either interiorly (as at bottom 76 of pot 22 in FIG. 3A) or exteriorly (as indicated in FIG. 4B at area 100). Hole 54 of base member 46 is aligned with portal 44 and adhesive layer 36 is attached to base 42 of pot 22 (if not done previously), so that drainage member 32 serves to provide direct fluid communication between interior 40 of pot 22 and second open end 58 of channel member 48. It will readily be appreciated that in FIG. 1 drainage member 32 can be used in conjunction with hose member 34 (i.e., so as to form drainage assembly 24 to provide further channeling of fluid away from undesirable area 30.)

Referring now in particular to the completed installation illustrated in FIG. 1, in addition to merely applying laminar tape 36 to exterior bottom 82 of wall 38 as described above, a primer may be applied to bottom portion proximate to portal 44 in an area approximately the same shape and diameter as laminar tape 36, prior to application of tape 36 to exterior bottom 82. The preferred primer (which should be preferably applied on a dry surface) is primer 94, manufactured by the 3M company of St. Paul, Minn. Drying of the primer can be facilitated by a heat source such as an air gun or hair dryer. In any event, portal 44 is indexed with hole 54 of base member 46 for fluidic communication, as described above.

Figure 3B:
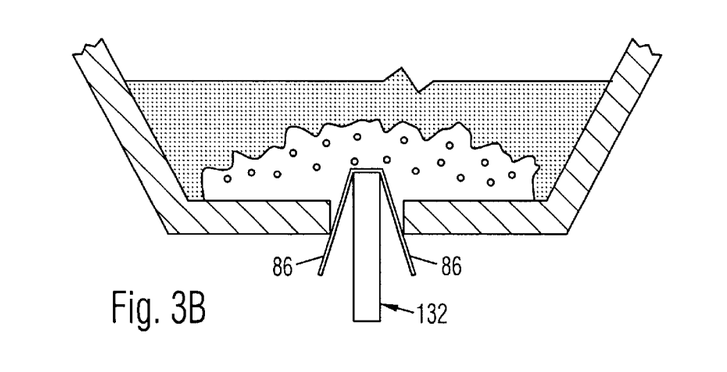
FIG. 3B is a partially sectional, side elevational view illustrating assembly of the drainage system of FIG. 3A.

Referring to FIGS. 3A and 3B, the method of installation will now be described. In the installation to arrive at the configuration of FIG. 3A, wherein interior 40 of pot 22 is already filled with soil 114 or the like, drainage member 132 is inserted through portal 44, sufficiently so that wing members 86 are resiliently deformed as indicated at FIG. 3B. It will be readily appreciated that the modification of base member 146 by the reduction of material as indicated at FIG. 4A facilitates the action of insertion of drainage member 132. Drainage member 132 is then further pressed through portal 44 until ring members 86 have completely entered interior 40 of pot 22, so that ring members 86 have substantially resumed their original, planar configuration as shown at FIG. 3A. See also FIG. 4C for a top view. Generally, no adhesive is used to adhere base member 146 to pot 22 in this installation.

Caulk is applied to bottom portion 82 at area 100 (see FIG. 4B) proximate to portal 44. It will be appreciated that area 100 describes an annular ring centered about portal 44. The difference in inner and outer diameter of area 100 is about ¼. The caulk is applied with sufficient thickness to exhibit a vertical profile of about ⅛.

Referring to FIG. 4A, hole 92 of first ring member ring 78 is then indexed with second open end 158 of channel member 148, slid along channel member 148 until first side 88 of first ring member 78 is sealingly engaged to bottom portion 82 of pot 22. Caulk is applied immediateley below the juncture of first ring member 78 with channel member 48, as indicated at location 84 (see FIG. 3A). Hole 98 of second ring member ring 80 is then indexed with second open end 158, slid along channel member 148 until first side 94 of second ring member 80 is sealingly engaged to second side 90 of first ring member 78, by virtue of application of caulk at location 84.

Referring to FIG. 3A, it should be noted that if system 120 is configured so that rings 78, 80 experience mechanical pressure either from blocks 26 (not shown) or from floor 28, it is preferred to use an extended cure time for the caulk, most conservatively 24 hours.

Referring to FIG. 6, the method of installation will now be described. In the installation to arrive at the configuration of FIG. 6, a drainage member 132 is constructed (as shown at FIG. 10, described above). Then caulk is applied to bottom 76 of pot 22 (in a manner analogous to that described for FIG. 4B with reference to area 100 of exterior bottom 82 above). Drainage member 132 (as shown in FIG. 10) is then placed into an empty pot 22 from above. Second open end 258 of channel member 248 (which has a preferred length of 4.) is then indexed with portal 44 and threaded therethrough until second side 52 of base member 46 is sealingly engaged with bottom 76 of pot 22, as shown in FIG. 6.

Hole 92 (see FIG. 4A) of first ring member ring 78 is then indexed with second open end 258, slid along channel member 248 until first side 88 of first ring member 78 is engaged to bottom portion 82 of pot 22. Note that no adhesive is required to seal first ring member 78 to pot 22. Rather, the main function of first ring member 78 in this embodiment is as a grab ring. Hose member 34 is then removably, snugly fit into second open end 258 of channel member 248 (in a manner as described for FIGS. 1 and 2).

Referring to FIG. 7, the method of installation will now be described. In the installation to arrive at the configuration of FIG. 7, a drainage member 332 (described above with reference to FIG. 10) is constructed. Primer is preferably applied to bottom 76 of pot 22 proximate to portal 44 in an area approximately the same shape and diameter as laminar tape 36, prior to application of tape 36 to bottom 76.

Drainage member 332 is then placed into an empty pot 22 from above, second open end 358 of channel member 348 is then indexed with portal 44 and threaded therethrough until second side 52 of base member 46 is sealingly engaged with bottom 76 of pot 22, as shown in FIG. 7. Hose member 34 is then removably, snugly fit into second open end 358 of channel member 348 (in a manner as described for FIGS. 1 and 2).

It should be generally noted that the embodiments employing a laminar tape 36 are easier for the consumer to install than those embodiments utilizing caulk. However, embodiments utilizing caulk in preference to laminar tape 36 exhibit more reliable adhesive action.

In operation, and referring once again to FIG. 1, drainage member 32 transfers fluid from interior 40 of pot 22 via channel 60 of channel member 48. It is understood that interior 40 is normally at least partially filled with soil 114 or the like and that the fluid may be draining from soil 114 or standing fluid in interior 40. Desirably and according to the invention the fluid (not shown), such as water, is transferred away from floor 28 or through floor 128 (see FIG. 5) if there is a hole or slats in a deck or the like. Water drips out gravitationally but not to the undesirable area 30 but instead is channeled either to second open end 70 of hose member 34 or to second open end 58 of channel member 48 (see FIG. 2C) if no hose member 34 is employed. In this fashion the fluid which gravitationally exits portal 44 is taken to an area more desirable than the area 30. In addition, an extra hose such as 104 of FIG. 8 could also be connected to second end 70 of hose member 34 for routing of the fluid even further from system 20 and undesirable area 30. In substitution for hose 104 it is readily appreciated that a garden hose or a metal conduit or the like could be used or any other external apparatus so as to channel water away. Each of the other drainage assemblies shown in FIGS. 3, 6 and 7 operate in analogous fashion.

In the event that channel member 32 is caught against deck 28 (for example, blocks 26 are not employed so that pot 22 is resting directly on floor 28), it will be readily appreciated that the deformability of channel member 48 serves to keep system 20 from being damaged, upended, or spilled. Also it will be readily appreciated that channel member 48 can have varying lengths as evidenced by FIG. 10 and the contrast of channel members 48, 148, 248, 348. In this fashion a longer channel member 48 could be used without the benefit of hose 34, if appropriate for a given configuration.

It should be apparent that the invention not only accomplishes the major functions required from such apparatus, but does so in a particularly advantageous manner. It should be equally apparent, however, that various minor and equivalent modifications from the embodiments disclosed herein for illustrative purposes could be employed without departing from the essence of the invention. It is to be understood, therefore, that the invention should be regarded as encompassing not only the subject matter literally defined by the claims which follow, but also mechanical equivalents thereof.

What is claimed is:

1. A drainage member for draining a fluid from a vessel with a portal at a flat bottom thereof, said drainage member comprising:
   a flat base member with an upper side a lower side, and a hole extending there between, said hole being completely open and free of any obstruction, said upper side of said base member for attaching to an exterior of said flat bottom of said vessel, said hole for being in alignment with said portal for draining said fluid;
   a channel member extending down only from said lower side of said base member so that said upper side is devoid of protrusions, said channel member including a longitudinal channel aligned with said hole; and
   a hose directly attached to said channel member and extending from a lower end of said channel member, said hose being positioned within said channel of said channel member.

2. A drainage member for draining a fluid from a vessel with a portal at a flat bottom thereof, said drainage member comprising:
   a flat base member with an upper side, a lower side, and a hole extending between said upper side and said lower side, said hole being completely open and free of any obstruction;
   a channel member extending down only from said lower side of said base member so that said upper side is devoid of protrusions, said channel member including a longitudinal channel aligned with said hole;
   a hose directly attached to a lower end of said channel member, said hose being positioned within said channel of said channel member; and
   an adhesive layer arranged on said upper side of said base member for attaching to an exterior of said flat bottom of said vessel, said hole for being aligned with said portal on said vessel for draining said fluid.

3. A drainage device, comprising:
   a vessel including a flat bottom and a portal on said flat bottom;
   a flat base member with an upper side, a lower side, and a hole extending between said upper side and said lower side, said hole being completely open and free of any obstruction;
   an adhesive layer arranged on said upper side of said base member and attached to an exterior of said flat bottom of said vessel, said hole of said base member being aligned with said portal on said vessel;
   a channel member extending down only from said lower side of said base member so that said upper side is devoid of protrusions, said channel member including a longitudinal channel aligned with said hole; and
   a hose directly attached to a lower end of said channel member, said hose being positioned within said channel of said channel member for draining a fluid from said vessel.

* * * * *